(12) United States Patent
Ogren

(10) Patent No.: US 8,403,477 B2
(45) Date of Patent: Mar. 26, 2013

(54) NOSEPAD CONNECTOR FOR EYEWEAR

(75) Inventor: Steve Ogren, Yorba Linda, CA (US)

(73) Assignee: Oakley, Inc., Foothill Ranch, CA (US)

( * ) Notice: Subject to any disclaimer, the term of this patent is extended or adjusted under 35 U.S.C. 154(b) by 81 days.

(21) Appl. No.: 12/980,206

(22) Filed: Dec. 28, 2010

(65) Prior Publication Data

US 2012/0057120 A1    Mar. 8, 2012

Related U.S. Application Data

(60) Provisional application No. 61/381,036, filed on Sep. 8, 2010.

(51) Int. Cl.
*G02C 5/12* (2006.01)
(52) U.S. Cl. ........................................ 351/136
(58) Field of Classification Search .............. 351/68–82, 351/124–139
See application file for complete search history.

(56) References Cited

U.S. PATENT DOCUMENTS

| | | | |
|---|---|---|---|
| 71,770 A | 12/1867 | Lomb | |
| 186,022 A | 1/1877 | Spencer | |
| 386,799 A | 7/1888 | Bowles | |
| 411,164 A * | 9/1889 | Molitor | 351/80 |
| 497,773 A | 5/1893 | Cowles | |
| 811,960 A * | 2/1906 | Seidel | 351/69 |
| 843,089 A | 2/1907 | Moore | |
| 979,095 A | 12/1910 | Reno | |
| 1,517,685 A | 12/1924 | Searles | |
| 1,607,699 A | 11/1926 | Searles | |
| 2,050,957 A | 8/1936 | Meyer | |
| 2,098,513 A | 11/1937 | Nerney | |
| 4,732,464 A | 3/1988 | Bononi | |
| 6,315,406 B1 | 11/2001 | Carraro et al. | |
| 2006/0187405 A1 | 8/2006 | Lee et al. | |

OTHER PUBLICATIONS

International Search Report and Written Opinion in PCT Application No. PCT/US11/50046 dated Dec. 22, 2011.

* cited by examiner

*Primary Examiner* — Huy K Mai
(74) *Attorney, Agent, or Firm* — Knobbe Martens Olson & Bear LLP

(57) ABSTRACT

The present disclosure generally relates to eyewear, and more particularly, to a nosepiece for an eyeglass frame configured to avoid entanglement or interference with external objects while raising or lowering the eyewear to or from a viewing position.

20 Claims, 12 Drawing Sheets

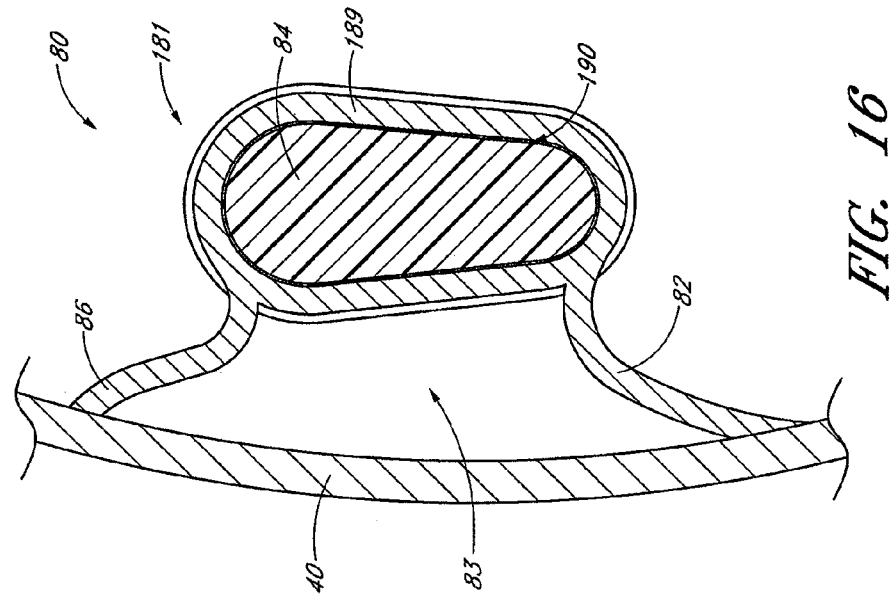
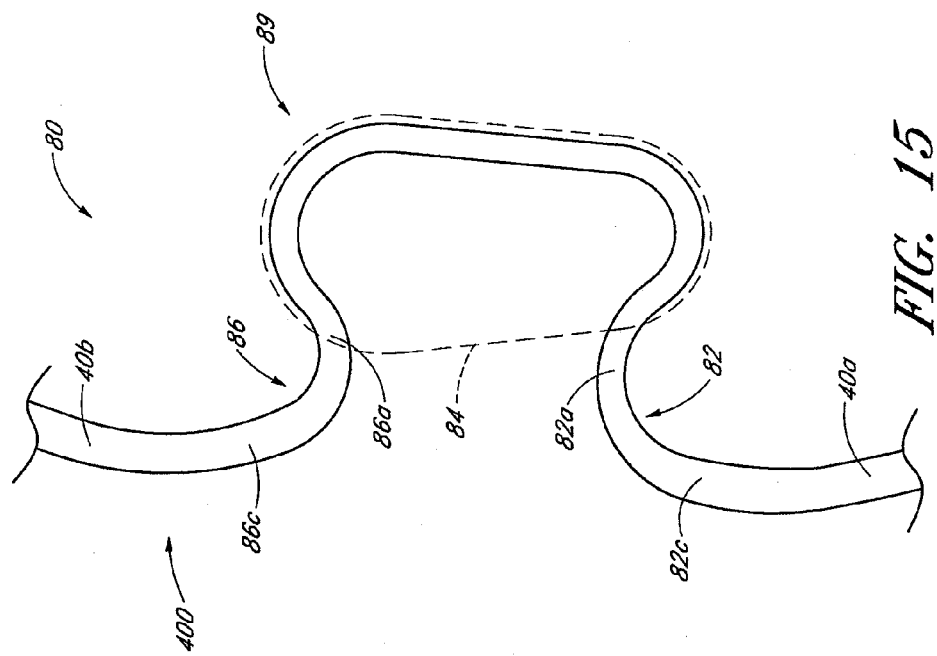

US 8,403,477 B2

NOSEPAD CONNECTOR FOR EYEWEAR

RELATED APPLICATIONS

This application claims the benefit under 35 U.S.C. §119 (e) of U.S. Provisional Application No. 61/381,036, filed on Sep. 8, 2010, titled "Nosepad Connector for Eyewear," the entire contents of which are hereby incorporated by reference and made a part of this specification.

BACKGROUND OF THE INVENTION

1. Field of the Invention

The present invention generally relates to eyewear, and more particularly, to nosepieces for eyewear.

2. Description of the Related Art

Eyewear generally includes a front portion with a pair of optical lenses or optical zones on opposing sides of a nose bridge. A pair of earstems typically extends in a posterior (e.g., rearward) direction from the front portion. A nosepiece may comprise a pair of bilaterally symmetrical nose pads which typically extend medially (e.g., inwardly) and/or in a posterior direction from opposing medial sides of the nose bridge to help support the eyeglasses on a wearer's nose. Each nosepiece may include a supporting frame connected between the nose pad and orbital to provide additional comfort and fit to the wearer.

SUMMARY

The present disclosure generally relates to eyewear, and more particularly, to nosepieces for an eyeglass frame configured to avoid entanglement or other interference with external objects while raising or lowering or otherwise moving the eyewear to or from a viewing position.

BRIEF DESCRIPTION OF THE DRAWINGS

The appended drawings, which are meant to illustrate and not to limit the invention, provide examples, in which:

FIG. 15 illustrates a partial side view of a nosepiece support formed integrally with an eyewear frame.

FIG. 16 illustrates a partial cross-sectional side view of a pad support attached to and supporting a pad.

DETAILED DESCRIPTION OF THE DRAWINGS

Figure 1:
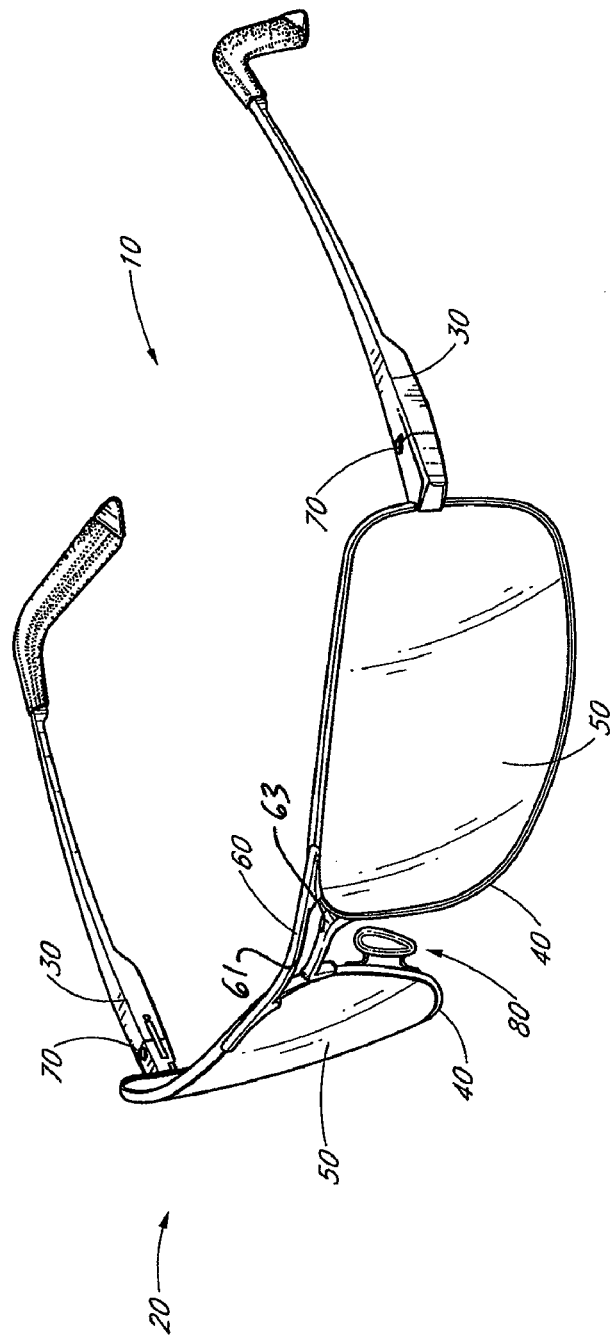
FIG. 1 is a front and left side perspective view of an embodiment of an eyewear with a nosepiece.
Figure 2:
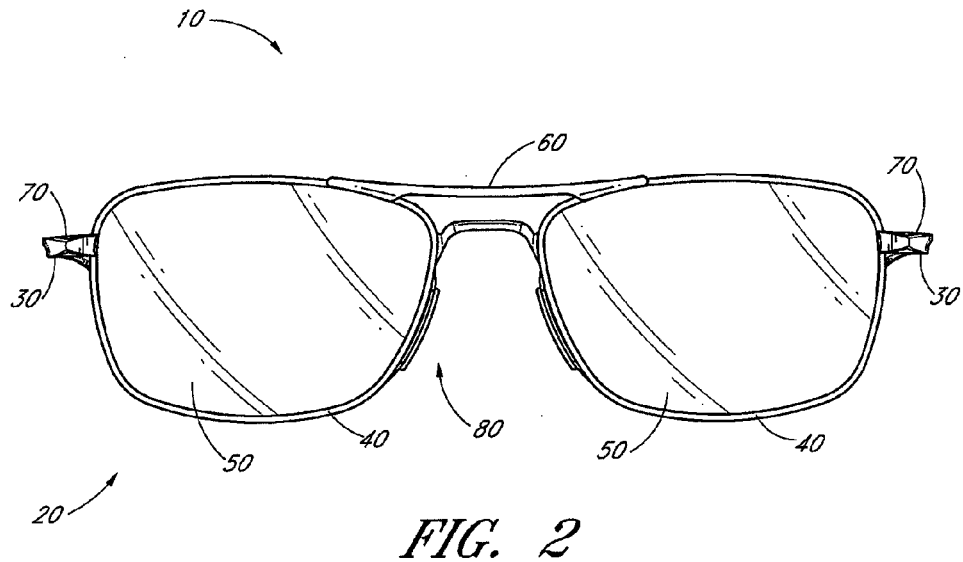
FIG. 2 is a front elevational view of the eyewear of FIG. 1.
Figure 3:
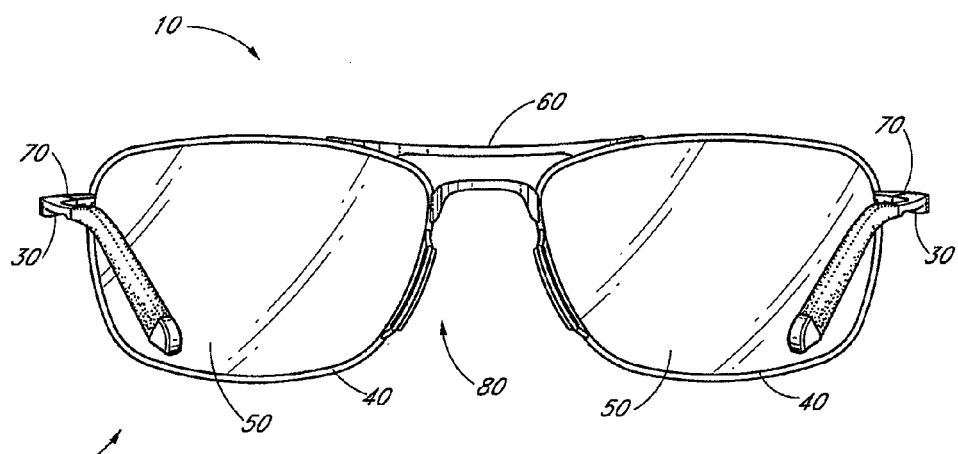
FIG. 3 is a rear elevational view of the eyewear of FIG. 1.
Figure 4:
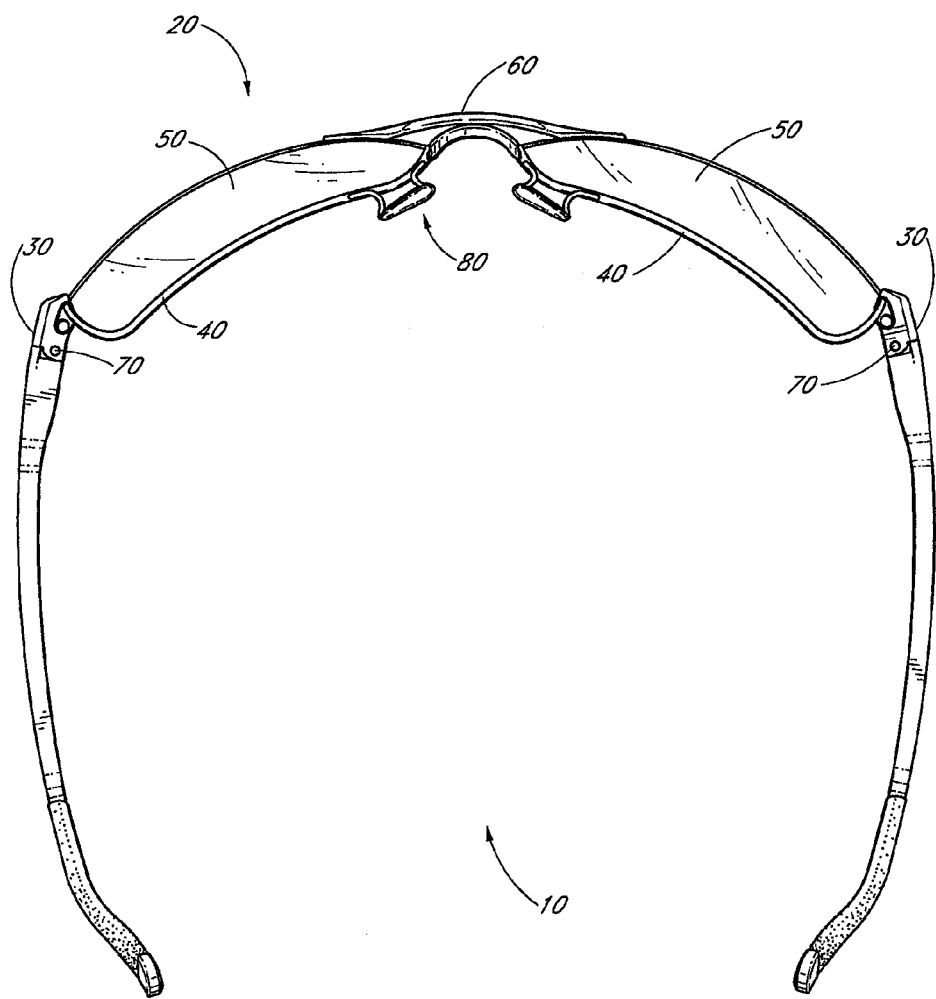
FIG. 4 is a bottom plan view of the eyewear of FIG. 1.
Figure 5:
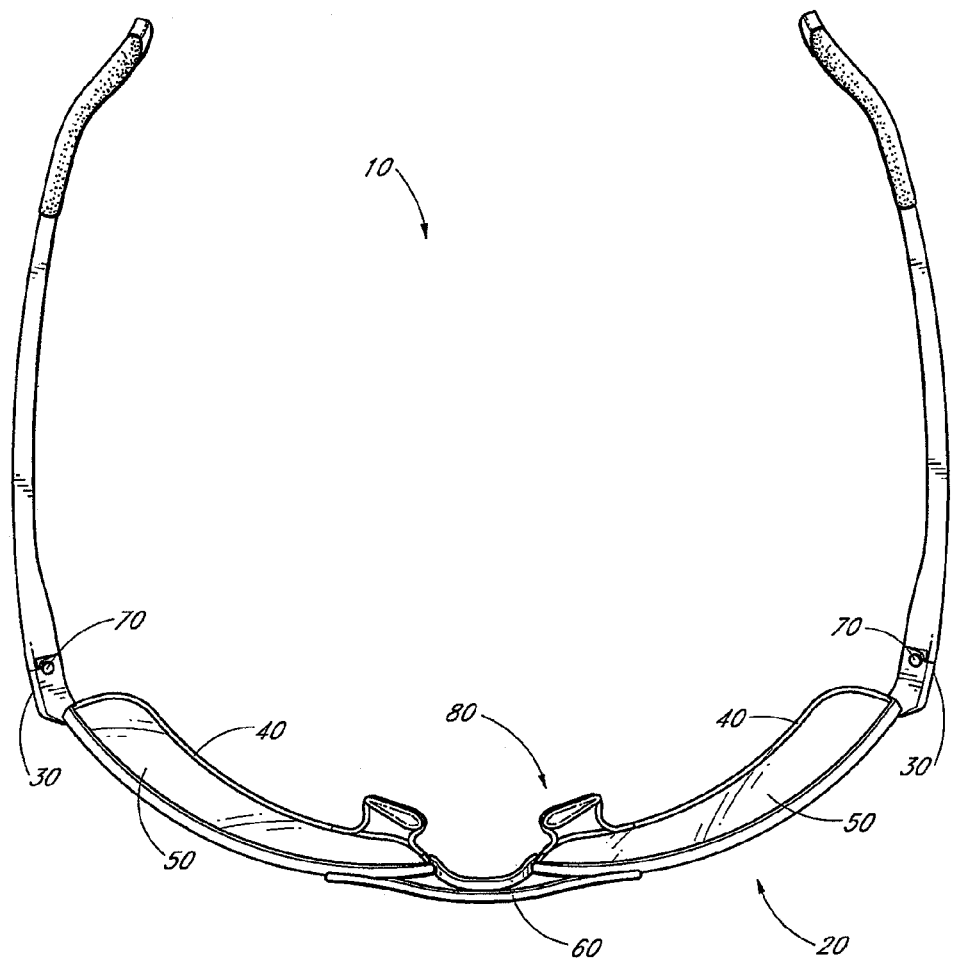
FIG. 5 is a top plan view of the eyewear of FIG. 1.

There are many different forms of eyewear, including eyeglasses, shields, goggles, etc. There are also many different forms of eyeglasses, including corrective or prescription eyeglasses, sunglasses, plano eyeglasses, dual lens eyeglasses, unitary lens eyeglasses, glass-lens eyeglasses, polymer-lens eyeglasses, framed eyeglasses, frame-less eyeglasses, etc. In some embodiments, eyewear such as the illustrated eyeglasses includes a front portion with left and right orbitals which support a pair of plano or ophthalmic optical lenses on opposing sides of a nose bridge. A pair of earstems can extend in a posterior (e.g., rearward) direction from the front portion. A nosepiece is provided to help support the eyeglasses on a wearer's nose. The nosepiece may include a pair of nosepiece pads which extend medially (e.g., inwardly) and/or in a posterior direction from opposing sides of the orbitals under the nose bridge. Each nose pad may include a supporting structure connecting the nose pad to the eyewear (e.g., via the frame) to provide additional stability of position and comfort to the user.

In some embodiments, the nosepiece comprises a left and right pad. Each pad is connected to the adjacent portion of the eyewear (e.g., an orbital) by an arcuate or curvilinear strut. A first end of the strut is welded, braised or otherwise connected to the medial edge of the eyewear. The strut extends generally upwardly to an apex region and then descends generally downwardly to a connection point on the pad. The connection to the pad may comprise a pivotable joint or a flexure point to provide a range of motion for the pad to improve fit.

In some embodiments, an arcuate strut has an upward facing apex and a downwardly opening concavity. A wearer may occasionally raise the eyeglasses from a first in use position in front of the wearer's normal line of sight to a second resting position across the top of the wearer's head. When the wearer returns the eyeglasses from across the top of the head to the normal position in front of the line of sight, the downward concavity of the nosepiece strut and/or the pivotable connection between the strut and the nose pad can become entangled with external objects, such as the wearer's hair, jewelry, etc. In some embodiments disclosed herein, the shape of the nosepiece strut can help to minimize, diminish, or eliminate entanglement or other interference.

FIGS. 1-5 illustrate various views of an embodiment of an eyeglass frame 10. The structures and steps disclosed herein can be used or applied to any type of eyewear. The eyeglass frame 10 can include a front portion 20 and a pair of earstem portions 30 for retaining the eyeglass on the head of the wearer. The front portion 20 can include a pair of lens supports, e.g. orbitals 40, which can be configured to support a pair of optical zones or lenses 50. The front portion 20 can also include a nose bridge 60 comprising one or more members extending between opposing inward, or medial sides of orbitals 40. The nose bridge 60 is shown with two generally horizontal nose bridge members 61, 63 extending between opposing medial sides of orbitals 40, and proximate to a superior (e.g., upper) portion of orbitals 40. In some embodiments, the eyewear can comprise a single strut or a nose bridge integrated as part of the frame, orbitals, lenses 50, etc.

The earstems 30 can extend in a posterior direction from opposing lateral (e.g., outer) sides of the front portion 20. In some embodiments, each earstem 30 can be connected to the front portion 20 by a hinge 70, to be movable between a folded position and an open position relative to the front portion 20. In some embodiments, each earstem portion can be connected to or unitarily formed with the front portion, wherein the earstems are substantially fixed relative to the front portion. In some embodiments, the earstems can be flexible to be movable between a folded position and an open position relative to the front portion without a hinge.

The orbitals 40 are shown completely surrounding the lenses 50 for exemplary purposes only. The orbitals may alternatively only partially surround the lenses, such as in embodiments in which a support extends along only a lower or upper portion of the lenses, or in rimless eyeglass frames, in which the earstems and/or the nose bridge are mounted directly to the lenses, without orbitals. Additionally, although the illustrated eyeglass frame 10 includes a pair of orbitals 40 supporting a pair of optical lenses 50, other arrangements are possible, such as those wherein a single, unitary lens extends across both the wearer's left and right eye lines of sight. The front portion 20, earstems 30, orbitals 40 and lenses 50 can comprise any of many different shapes, sizes, materials and configurations. Injection molding, casting, machining, and other construction techniques for these components can be used.

Figure 18:
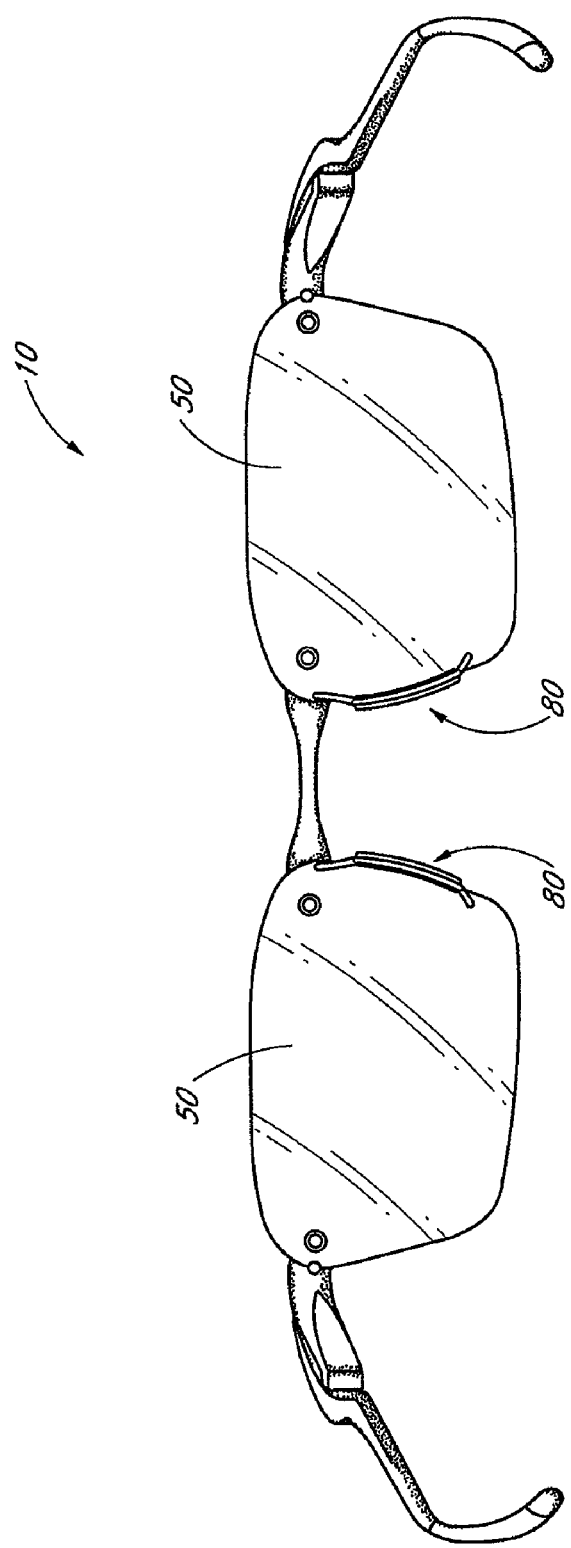
FIG. 18 is a rear elevation view of a nosepiece having support frames attached directly to a pair of lenses.

The nosepiece 80 can be permanently or removably attached to the orbitals, frame, lenses, etc. to support the eyeglass on the nose of a wearer. The embodiments of the nosepiece 80 are described herein in the context of eyeglass frames for exemplary purposes only, and can be employed in other types of eyewear. The nosepiece 80 can attach to opposing medial portions of each of the orbitals 40, and in some embodiments, inferior to (e.g., below) the nose bridge 60, as shown for exemplary purposes in FIGS. 1-5. In some embodiments, a nosepiece can attach to various portions of frame 10, including the orbitals 40, nose bridge 60, lenses 50, and/or any intermediate support structure, etc. The embodiment shown in FIG. 18 shows, for exemplary purposes only, nosepiece 80 attached to opposing medial portions of each of the lenses 50.

Each of the nosepieces 80 can extend in an anterior (e.g., forward), or a posterior direction from its point of attachment to frame 10 (e.g., the opposed medial edges of the orbitals 40). Each of nosepieces 80 can extend laterally or medially from its point of attachment to frame 10. The illustrated embodiment shows different portions of the nosepieces 80 extending both medially and in a posterior direction from the opposed medial edges of the orbitals. Nosepieces 80 can be permanently or removably attached to eyeglass frame 10 in many ways, such as with fasteners, threaded engagement, adhesives, welding, soldering, ultrasonic bonding, friction fit, press fit, snap fit, and the like. Nosepieces 80 can be separately formed, or integrally formed with various portions of frame 10, including any of the orbitals 40, nose bridge 60, lenses 50, and/or any intermediate support structure. Each of the nosepieces 80 can comprise a nose pad to improve the comfort and fit of the nosepiece 80, and a pad support structure to support the pad, as described further herein.

Figure 6:
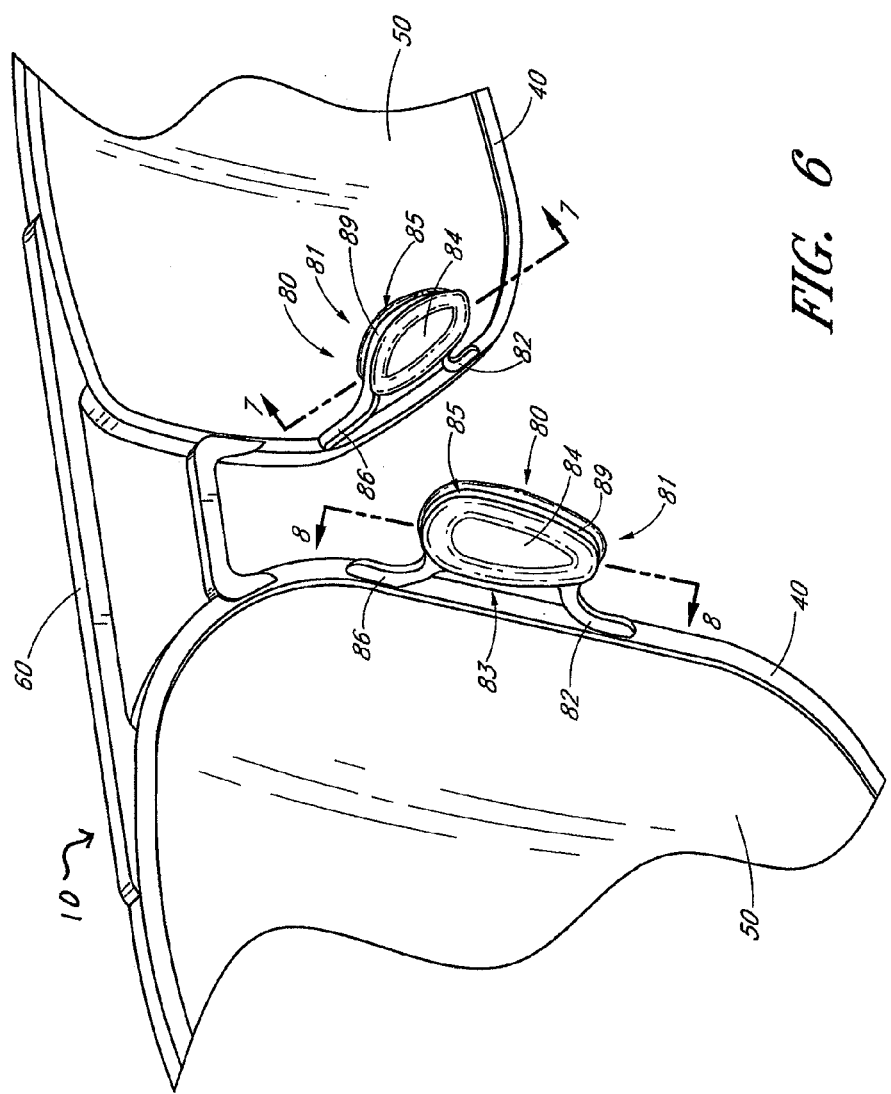
FIG. 6 is a partial, close-up rear and left perspective view of a pair of nose pads from the eyewear of FIG. 1.
Figure 7:
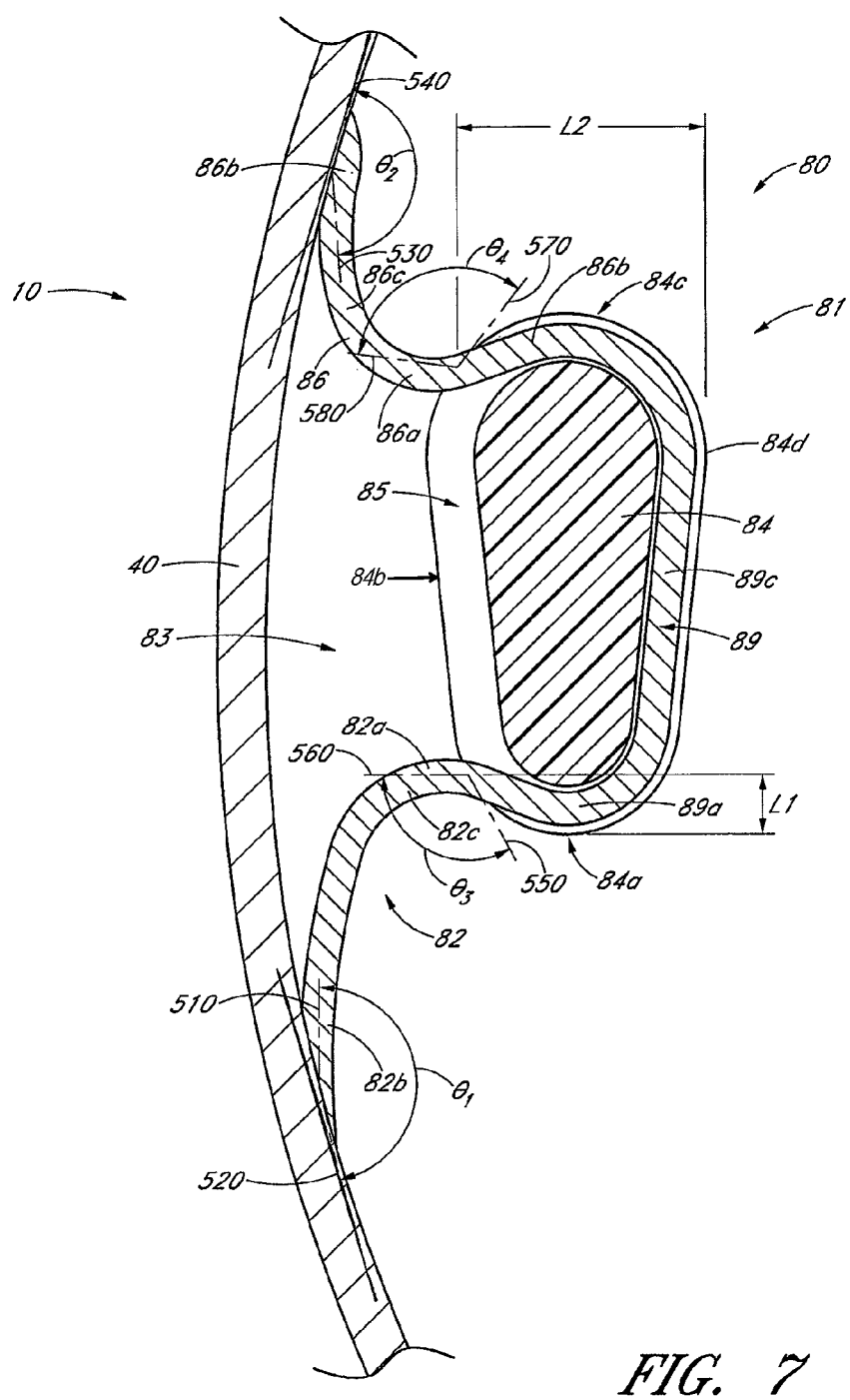
FIG. 7 is a partial cross-sectional view taken along line 7-7 of FIG. 6.

FIG. 6 is a partial, close-up rear and left perspective view of an embodiment of a nosepiece 80 supported by the eyeglass frame 10 of FIGS. 1-5. FIG. 7 is a cross-sectional view of an embodiment of the nosepiece 80 taken along line 7-7 of FIG. 6. Referring to both FIGS. 6 and 7, nosepiece 80 can comprise a left and right pad support 81 extending between a portion of frame 10 and a corresponding left and right nosepiece pad 84. Pad support 81 and pad 84 can be configured to reduce snagging of objects on nosepiece 80, to provide greater support to pad 84, and/or for aesthetic purposes. In some embodiments, pad support 81 can be configured to be attached to a portion of frame 10 (e.g., orbital 40) or to lenses, or optical zones, to form a partially, substantially, or entirely enclosed cell 83 between pad 84 and said portion of frame 10, to reduce snagging or catching of foreign objects between the pad and adjacent orbital or pad support.

Nosepiece pad 84 can comprise any of many different shapes, such as a substantially circular, semicircular, substantially oval, substantially elliptical, substantially rectangular, substantially trapezoidal, substantially triangular, substantially egg or substantially tear shape (e.g., an inverted tear shape as illustrated), among others. As mounted, the nose pad 84 can have a medial surface which contacts the wearer's nose, and a lateral surface facing in an opposing direction. Pad 84 can include various contours (e.g., FIG. 8), perforations, protrusions, ridges, surface textures, or coatings particularly on the medial surface for added grip, stability, and comfort to a user's nose. Pad 84 can comprise an elastomeric, resilient, and/or conforming material, such as a soft polymer, for a comfortable and secure fit. Nosepiece pad 84 can comprise two or more components that mount on opposing sides of pad support 81, such as two or more portions with corresponding contact surfaces (e.g., "clam-shell"-type shapes) that may be snap fit, adhesively bonded or otherwise secured to each other. Nosepiece pad 84 can comprise approximately straight, generally parallel, tapered, and/or curved edges, sides, or surfaces, along any of its length, width or thickness. In the exemplary embodiment of FIGS. 6 and 7, nosepiece pad 84 is an oblong shape, with a greater radius curve at its superior end than at its inferior end.

Nosepiece pad 84 can comprise any of many different materials, such as plastic or metal. Rubberized or elastomeric materials can be used. Each pad 84 can comprise more than one material, such as a composite, or a metal coated with rubber, plastic, or foam. Pad 84 can be thermally, chemically or mechanically treated to provide, or can comprise any material that provides, increased durability, flexibility, moisture absorption or adsorption, tackiness, and/or chemical resistance. Pad 84 can comprise a material of any color, and can comprise a substantially transparent, opaque, or translucent material, or any combination thereof. In an embodiment, a portion of pad 84 is substantially transparent or translucent, to allow a user to view a portion of the pad support 81 therethrough. The color, transparency, translucency, and/or opacity of the material of pad 84 can be selected for aesthetic reasons (e.g., to show or hide a portion of the pad support 81 through pad 84), or for the specific optical characteristics of the pad material (e.g., its reflectivity, refractivity, etc).

Nosepiece pad 84 and pad support 81 can attach to each other, and can be separately or integrally formed with each other, such as by using any of the structure or methods described further herein for attaching nosepiece 80 to a portion of frame 10. In some embodiments, as illustrated, the pad support 81 connects to the pad 84 on at least two points, such as an upper point of attachment and a lower point of attachment with a generally continuous loop between the two points of attachment. As illustrated, the pad support 81 can contact the pad 84 along a majority of the circumference of the pad 84. In some embodiments, the nosepiece pad can attach to the pad support in many different ways, such as with a friction fit, press fit, snap fit, interference fit, etc. In some embodiments, the nosepiece pad 84 can include a receiving portion, e.g., a groove and/or channel, such as on a peripheral edge of the pad or on a mounting post extending from the lateral surface of the pad, configured to easily receive and attach pad 74 to the support structure 81. As illustrated, the peripheral or circumferential region of the pad 84 can extend outwardly beyond the support structure 81 along all or substantially all of the region of the nosepiece that is configured to contact a wearer's face to provide a comfortable fit. The receiving portion can allow a user to easily assemble and/or remove the pad 84 from frame 10 for cleaning or replacement.

Figure 8:
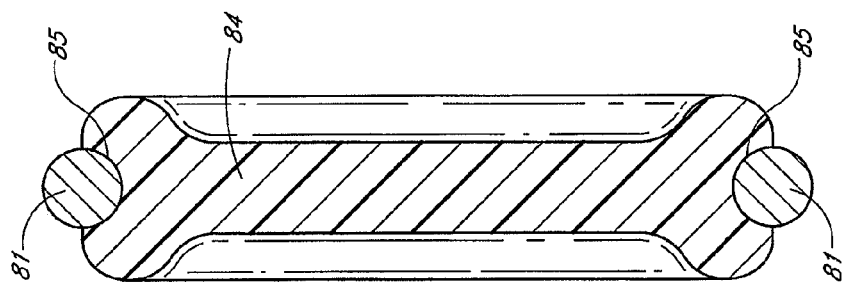
FIG. 8 is a partial cross-sectional view taken along line 8-8 of FIG. 6.

FIG. 8 is a cross-sectional view of an embodiment of the nosepiece taken along line 8-8 of FIG. 6. Referring to FIGS. 6-8, pad 84 can comprise a receiving portion, illustrated as a groove 85, sized and shaped to permanently or removably receive and be supported by a portion of the pad support 81. The groove 85 can comprise a depth extending radially inwardly from an outer-facing peripheral edge of pad 84. FIG. 8 shows groove 85 sized and shaped to only partially receive the pad support 81 therein. Pad 84 can include a receiving portion configured such that pad support 81 can be approximately flush mounted (FIG. 9), or partially recessed (FIG. 10) relative to a surface of pad 84. In some embodiments, the depth of the groove 85 can be at least as large as the diameter or cross-sectional width of the pad support 81. Pad support 81 can carry or support the pad 84 by wrapping partially, substantially entirely, or entirely around the peripheral edge of the pad, within the groove 85.

In some embodiments, the groove 85 can extend around at least about 25%, at least about 50%, at from about 75% to about 100% of the peripheral edge of the pad 84.

Figure 10:
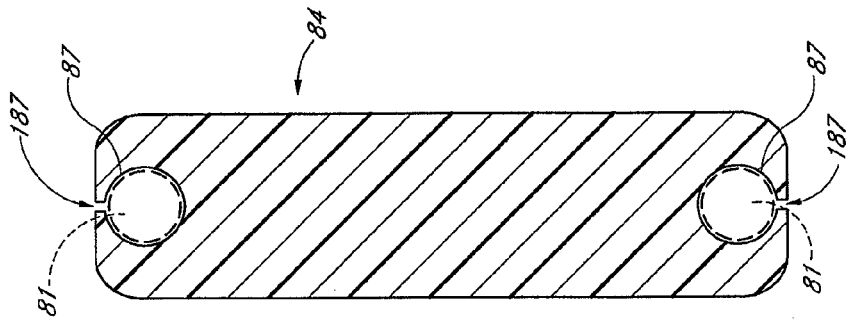
FIG. 10 is a partial cross-sectional view as in FIG. 8 of another construction of a nosepiece pad.

In some embodiments, the width (e.g., diameter) of groove 85 can be within the range of from about 20% to about 80% of the thickness of pad 84. In FIGS. 8 and 10, groove 85 is shown approximately centered relative to the central plane of pad 84. Groove 85 can be positioned medially or laterally relative to the thickness of pad 84.

The pad support 81 illustrated in FIG. 6 resides within a groove 85 and encircles a sufficient perimeter of the pad 84 to secure the pad 84 to the eyeglass orbital under normal use conditions. In some embodiments, the pad support 81 can extend around at least about 50%, at least about 70%, or at least about 85% of the circumference or periphery of the pad. In the embodiment of FIG. 16, described below, the pad support 81 encircles the entire peripheral edge of the pad 84.

Although the cross-sectional shape of the pad support 81 and complementary groove 85 (FIG. 8) is illustrated as substantially circular, pad support 81 can comprise many different cross-sectional shapes, such as substantially square, ovular, rectangular, triangular (inverted or otherwise), trapezoidal, arch-shaped, semicircular, or any other shape that can be received by and reside within a complementary groove 85.

Figure 9:
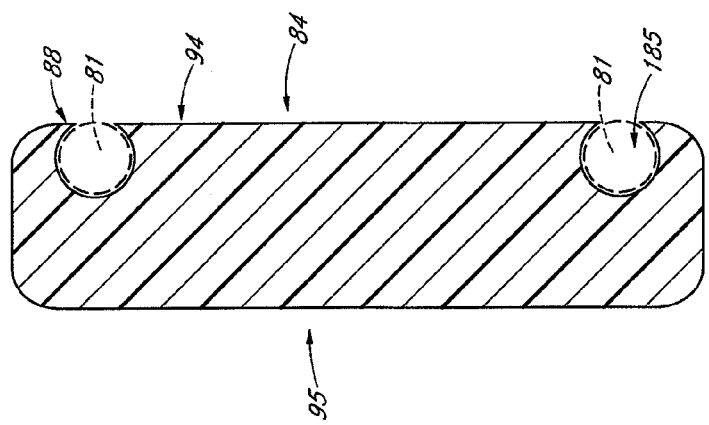
FIG. 9 is a partial cross-sectional view as in FIG. 8 of another construction of a nosepiece pad.

FIG. 9 is a cross-sectional view of an embodiment of pad 84 comprising a groove 185 positioned along a longitudinal face 94 of the pad 84. In many respects, pad 84 and groove 185 are substantially similar to and can function structurally similar to the manner of pad 84 and groove 85 shown in FIGS. 6-8. Pad 84 and groove 185 differ in that groove 185 can extend in depth transversely inwardly from a side surface 94 of pad 84. When pad 84 is mounted to pad support 81, side surface 94 can be positioned to face medially, such that side surface 94 contacts a user's nose, or laterally, such that opposing side surface 95 contacts a user's nose. The directions "medial" and "lateral" as used herein in reference to the pads, pad supports, and the elements thereof, can alternatively or additionally be defined as "anterior" and "posterior" directions, respectively, relative to frame 10 and its other components, depending on the mounting of nosepiece 80 relative to frame 10 (see, e.g., FIGS. 4 and 5).

The groove 185 can comprise a lip 88 that extends partially over the opening of groove 185, to further embed the support within the pad and thus provide improved attachment and support. Lip 88 is not limited to the embodiment of pad 84 shown in FIG. 9, and can be used with the other embodiments of the pads described herein. Groove 185 can extend around the circumference of the side surface 94, spaced inwardly from the peripheral edge as groove 85 discussed above.

FIG. 10 illustrates an embodiment of pad 84 comprising an embedded channel 87. Channel 87 is structurally similar to and can function similar to the manner of grooves 85, 185 in FIGS. 6-9. Channel 87 differs from groove 85 in that channel 87 is more deeply embedded into the peripheral edge of the pad, to provide additional support to pad 84, or for aesthetic purposes.

Channel 87 can comprise a slit, or gap 187 along some, most, or all of its length to allow passage of pad support 81 into channel 87 when pad 84 is being attached to support structure 81. In some embodiments, the pad may be mounted to the pad support by press fitting the pad into engagement with the support, and allowing the pad to elastically deform until the pad support has been received within the corresponding channel. For this purpose, the pad is preferably formed from suitably elastic material such as silicone rubber, or styrenic block copolymers such as a polystyrene-rubber copolymer available from Krayton Polymers, Inc. Higher durometer (more rigid) materials can be used and molded around the pad support 81. In some embodiments, channel 87 wraps completely around the longitudinal circumference of pad support 81.

Figure 13:
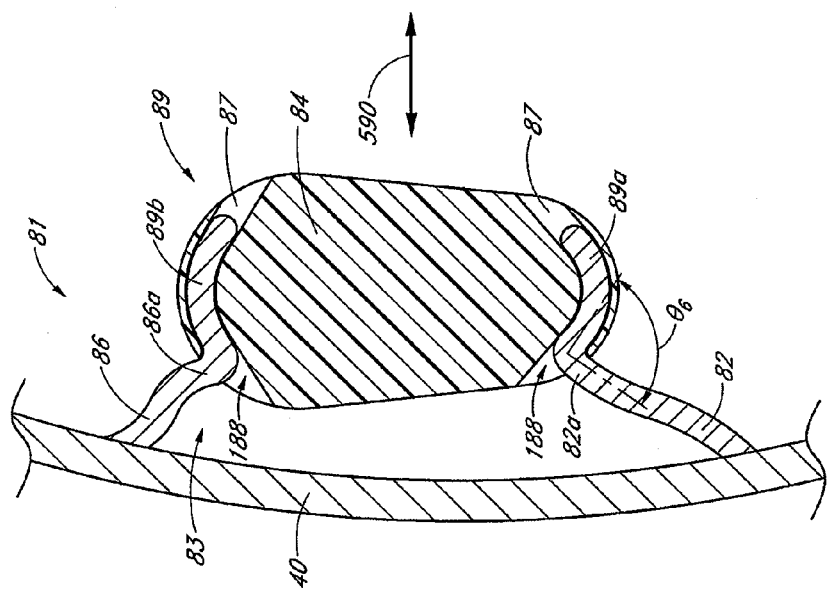
FIG. 13 shows a side schematic view of a nosepiece support.

Channel 87 can comprise an opening 188 along the peripheral edge or one of the sides of pad 84 into which an elongated portion of structure 81 can be inserted (see FIG. 13). Openings 188 can be positioned at either or both sides (e.g., medial or lateral sides) of pad 84.

Referring again to FIGS. 6 and 7, the pad support 81 can comprise any of a variety of materials with sufficient rigidity to hold pad 84, and support eyeglass frame 10 on a user's nose. In some embodiments, support structure 81 comprises a metal such as a formed metal wire strut with sufficient flexibility to allow adjustment of the support structure to fit the wearer's nose. As illustrated in FIG. 6, either or both of the upper and lower struts 86, 82 can be shaped and oriented to follow a generally smooth, curvilinear path that proceeds continuously upwardly (for lower strut 82) and/or continuously downwardly (for upper strut 86) from the point or region of contact with the rear surface of the eyewear face to the point of first contact with the pad 84.

The pad support 81 can comprise a pad support member 89 such as a closed metal loop configured to at least partially encircle and support pad 84. As illustrated, in some embodiments, the pad support member and struts 82, 86 can be integrated together in a unitary fashion. In some embodiments, the pad support 81 (e.g., pad support member 89, struts 82, 86) and/or pad 84, and/or frame 10 (e.g., orbital 40) can comprise a rotational member that allows pad 84 to rotate relative to pad support 81, and/or allows pad support 81 to rotate relative to frame 10, for comfort and fit of nosepiece 80 to a user's nose. The rotational member can comprise any of many structures known in the art that provide rotational movement, such as a hub, bearing, hinge, pin, ball and socket, axle, rotational joint, clutch, disc, gears, or sliding relationship between the support loop 89 and pad 84.

Pad support member 89 can be configured to attach directly to a portion of frame 10, or can attach to one or more intermediate support elements that are attached to frame 10. In some embodiments, pad support 81 can comprise a pad support member 89 that is attached to two support elements, e.g., first and second struts 82 and 86, each of which can be attached to a portion of frame 10 (e.g., orbitals 40).

The curvature (if any), shape, and positioning (e.g., relative to frame 10 and pad 84) of struts 82 and/or 86 is preferably selected to reduce the occurrence of hair snagging on nosepiece 80, and potentially to provide greater support. Struts 82 and 86 can comprise any of many shapes, such as any of the longitudinal cross-sectional shapes described herein for groove 85 and pad support member 89. The shapes of struts 82 and 86 can be the same or different relative to each other and relative to groove 85 and pad support member 89. Struts 82 and 86 can be hollow or solid. Either or both of struts 82 and 86 can be integrated or unitary with another structure. Struts 82 and 86 can each be different sides of the same structure. For example, in some embodiments, the generally vertical region between the struts 82 and 86 can comprise a solid or unitary component in which either or both of the struts 82 and 86 forms the upper and/or lower side(s). The solid or unitary component can comprise one or more openings therein. In some embodiments, struts 82 and 86 can comprise an elongated shape to support and attach to pad 84 and/or pad support member 89. Struts 82 and/or 86 can comprise one or more substantially straight or curved (e.g., concave or convex) sections, or any combination thereof.

Figure 11:
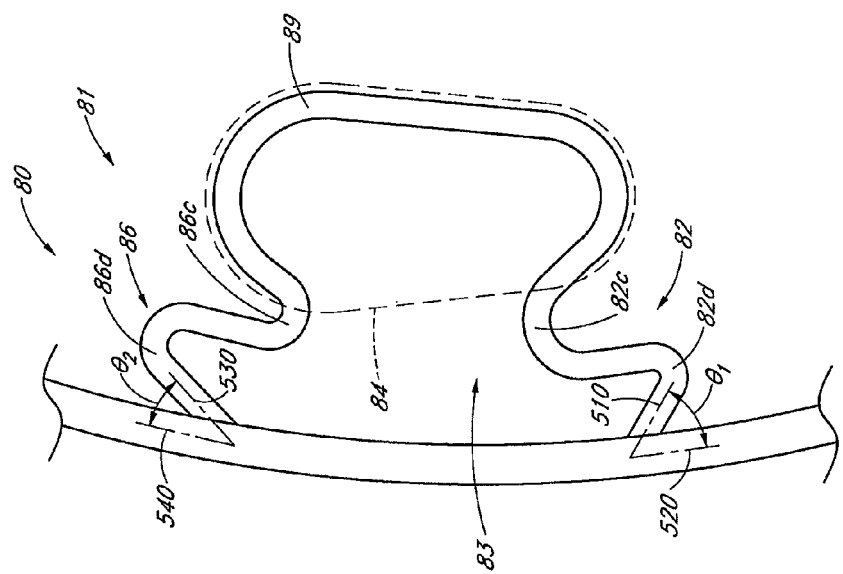
FIG. 11 shows a side schematic view of a nosepiece support.

Referring to FIG. 7, the illustrated struts 82 and 86 comprise an approximately concave section, having an inferior facing concave section 82c of strut 82 and a superior facing concave section 86c of strut 86. As illustrated in this and other embodiments, the pad support 81 can comprise at least two generally oppositely facing curves. Concave sections 82c, 86c can provide a gradual and generally smooth transition between struts 82, 86, respectively, and pad 84, to prevent external objects, such as hair, skin, or other items, from moving laterally in between the nose pad and adjacent orbital. As illustrated, strut 82 can be shaped so that one or more points in the region between the point of connection to the eyewear and the lowermost point of contact with the pad 84 are higher or upwardly displaced from the lowermost portion of the pad 84a. Similarly, as illustrated, strut 86 can be shaped so that one or more points in the region between the point of connection to the eyewear and the uppermost point of contact with the pad 84 are lower or downwardly displaced from the uppermost portion of the pad 84c. In some embodiments, as illustrated in FIG. 11, struts 82 and/or 86 can comprise a substantially outwardly convex section, such as an inferior facing convex section 82d or a superior facing convex section 86d. The shape of struts 82 and/or 86, and the angles at which they extend from frame 10 can be selected to prevent the user's hair, jewelry, and the like from snagging or catching on struts 82 and/or 86. The distal ends 82a, 86a, respectively, of struts 82 and 86 can attach to pad support member 89 along an inferior and superior portion of pad support member 89, respectively. The proximal ends 82b, 86b of struts 82 and 86, respectively, can attach to and be spaced apart from each other along frame 10. Pad support member 89 and struts 82 and 86 can attach to various portions of the frame 10 using any of the methods or structures, such as those described elsewhere herein. Pad support member 89 and struts 82 and 86 can be separately or integrally formed relative to each other and the remainder of frame 10. In the illustrated embodiment, struts 82 and 86 are attached to pad 84 and pad support member 89 to form an enclosed cell 83 between pad 84 and orbital 40 that can prevent snagging of objects on nosepiece 80.

As illustrated in FIG. 7, struts 82 and 86 can attach to frame 10 at angles θ1 and θ2, respectively. In the present context "attached", "connected" and like terms include separately formed structures or integrally formed structures, such as those formed by molding or bending a continuous length of wire. As used herein, angle θ1 is defined as the angle between axes 510 and 520. Axis 510 extends approximately parallel with the longitudinal axis of the end portion of strut 82, and generally along the centerline of strut 82. Axis 520 extends approximately parallel with (or tangential to) an outer edge or side of an inferior portion of frame 10 (or a lens or an optical zone) to which strut 82 is attached (e.g., orbital 40). As used herein, angle θ2 can be defined as the angle between axes 530 and 540. Axes 530 and 540 can be defined similarly to axes 510, 520, respectively, but with axis 530 defined relative to strut 86, and with axis 540 relative to strut 86.

Angles θ1 and θ2 can be selected to provide a generally smooth, generally continuous outer edge from the inferior to the superior points of attachment to the orbital, including along the medial edge of the pad. Angles θ1 and θ2 can comprise the same or substantially different angles. In some embodiments, either or both of angles θ1 and θ2 comprise substantially acute angles (FIG. 11), or preferably substantially obtuse angles (FIGS. 7, 12-14). In some embodiments, either or both of angles θ1 and θ2 can range from at least about 5 degrees and/or less than or equal to about 175 degrees, or at least about 90 degrees and/or less than or equal to about 170 degrees. Angles of at least about 145° or at least about 165° can provide a smooth generally vertical transition from the attachment point on the frame, lens, or optical zone.

Struts 82 and 86 can attach to various locations relative to pad 84. As illustrated, the shape and orientation of the pad support 81, and the manner of connection between the pad support 81 and the pad 84, can be configured to eliminate or avoid narrow, deep, and/or angular passages or constrictions that may otherwise cause the nosepiece 80 to become entangled with or interfere with other objects, especially long, thin objects such as hair and jewelry. Referring to FIG. 7, distal region 82a can be connected to an inferior portion of the pad support at an angle θ3 between axes 550 and 560, and/or distal region 86a can be connected to a superior portion of pad 84 at an angle θ4 between axes 570 and 580. Axis 550 extends approximately parallel with (or tangential to) an outer edge or side of pad 84, and can be proximate to an inferior portion of pad 84. Axis 560 extends approximately parallel with the longitudinal axis of strut 82, proximate to distal region 82a and generally along the centerline of strut 82. Axes 570 and 580 can be defined similarly to axes 550, 560, respectively, but with axis 570 extending proximate to a superior portion of pad 84, and with axis 580 defined relative to strut 86. Angles θ3 and θ4 can be selected for similar reasons, and within similar ranges as described herein for angles θ1 and θ2. It will be understood that angles θ1, θ2, θ3, and θ4 can be the same or different relative to each other.

Distal region 82a can be positioned along a side 84a of pad 84 at an inferior distance L1 defined as the distance between the distal region 82a of strut 82 (e.g., the intersection of axes 550 and 560) and an inferior end 84a (e.g., an inferior-most edge or tip), of pad 84. In some embodiments, the portion of medial side 84b extending along the distance L1 can be susceptible to catching on external objects. Thus, the distance L1 can be selected to prevent pad 84 from catching on external objects. Distance L1 can also be selected to provide greater support to pad 84 and pad support member 89, and/or for aesthetic reasons. In some embodiments, L1 can range from approximately 0.1 to approximately 20 mm, or more narrowly, from approximately 0 mm to approximately 15 mm, or from approximately 1 mm to approximately 10 mm, or approximately 2 mm to approximately 6 mm. In some embodiments, L1 can be defined as a percentage of the overall length (or as shown here, height) of the pad 84. In some embodiments, L1 can range from approximately 1 to approximately 50% of the overall length of pad 84, or more narrowly, approximately 2 to approximately 25%, or more narrowly, approximately 3 to approximately 15%, or even more narrowly, approximately 3 to approximately 10% of the overall length of pad 84. As illustrated, the contours of the struts 82 and 86 can be configured to transition from a generally vertical orientation at the connection point with the frame, lens, or optical region, to a generally horizontal orientation at the connection point with the pad 84, including one or more generally smooth curvatures and without sharp or abrupt changes in direction. In some embodiments, the distal regions 82*a* and 86*a* can extend or dip vertically upwardly (for 82*a*) and extend or dip vertically downwardly (for 86*a*) beyond the corresponding lower (for 82*a*) and upper (for 86*a*) edges of the pad 84 by a comparatively short distance to assist in securing the pad 84 to the pad support 81, but not far enough to create an entanglement region. In some embodiments, this distance of upward and/or downward extension or dip can be approximately the same size as or less than the horizontal width or thickness of the pad 84 on either the upper and/or lower sides. In some embodiments, as illustrated in FIG. 7, the vertical distance between the uppermost point on the lower strut 82 and the lowermost point on the nose pad 84 can be generally small, such as about the same size or smaller than the thickness of the gauge of the strut 82 itself; or about the same size or smaller than the width (anterior to posterior) of the pad 84; or about the same size or smaller than the horizontal distance spanned by the strut 82 between the point or region of connection with the rear surface of the eyewear face and the point or region of first contact with the nose pad 84; or about the same size or smaller than the horizontal distance spanned by a single concavity in the strut 82. All of these sizes and proportions are illustrated in FIG. 7. As illustrated, the upper strut 86 can also include the same or similar sizes and proportions with corresponding structures on the upper side. Moreover, as illustrated, the distance between the upper and lower ends of the pad can be greater than or equal to the distance between the closest points on the first and second struts.

Distal region 86*a* can be similarly positioned along the medial side 84*b* of pad 84 at a superior distance defined as the distance between the distal region 86*a* of strut 86 and a superior end 84*c* (e.g., a superior-most edge or tip) of pad 84 that corresponds to any of the above ranges provided for distance L1. The distance between distal region 86*a* of strut 86 and the superior end 84*c* of pad 84 can be selected for similar reasons, and within similar values or ranges as described herein for L1. The superior distance between distal region 86*a* and superior end 84*c* can be the same or different within any given embodiment as distance L1. In some embodiments, L1 and/or the distance between distal region 86*a* and the superior end 84*c* can be approximately zero (e.g., the struts 82, 86 can be generally flat, without an appreciable concavity, near the upper and lower edges of the pad 84).

Distal region 86*a* can be positioned along the superior end 84*c* of pad 84 at a medial distance L2 defined as the distance between a lateral side 84*d* (e.g., the lateral-most edge) of pad 84 and the distal region 86*a* of strut 86 (e.g., the intersection of axes 570 and 580). The portion of the superior end 84*c* extending along the distance L2 can be susceptible to catching on external objects. Thus, the distance L2 can be selected to prevent superior end 84*c* from catching on external objects and for other reasons substantially similar to that described above for distance L1 and the inferior end 84*a*. In some embodiments, L2 can range from approximately 0 mm to approximately 15 mm, or from approximately 1 mm to approximately 10 mm, or from approximately 2 mm to approximately 8 mm, or from approximately 3 mm to approximately 7 mm. In some embodiments, L2 can be defined as a percentage of the overall width of the pad 84. In some embodiments, L2 can range from approximately 1 to 99% of the overall width of pad 84, or more narrowly, 10 to 95%, or more narrowly, 45 to 95%, or even more narrowly, 70 to 90% of the overall width of pad 84. L2 can be approximately zero, wherein strut 86 is attached to pad 84 proximate to the lateral side or edge 84*c* of pad 84. L2 can be approximately 100% of the overall width of pad 84, wherein strut 86 is attached to pad 84 proximate to the medial side or edge 84*b* of pad 84.

Distal region 82*a* can be positioned along pad 84 along the inferior end 84*a* of pad 84 at a medial distance defined as the distance between a lateral side 84*d* (e.g., the lateral-most edge) of pad 84 and the distal region 82*a* of strut 82 (e.g., the intersection of axes 550 and 560) that corresponds to any of the above ranges provided for distance L2. The lateral distance between the lateral side 84*d* of pad 84 and the distal region 82*a* can be selected to prevent the inferior end 84*a* of pad 84 from snagging on foreign objects and for other reasons substantially similar to and with similar values or ranges as that described above for distance L2 and the superior end 84*c*. It will be understood that the medial distance L2 and the medial distance between the inferior end 84*a* and the lateral side 84*d* can be approximately the same or different relative to each other.

Figure 19:
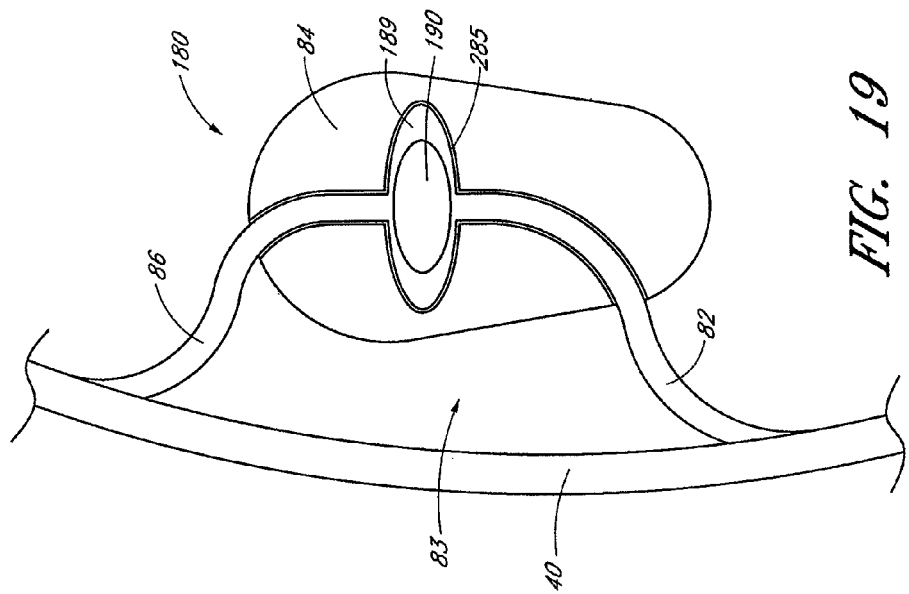
FIG. 19 is a side view of a pad support attached to and supporting a pad.

Continuing to refer to FIGS. 6 and 7, pad support member 89 can comprise any of many shapes, including any of the shapes described herein for struts 82, 86, grooves 85, 185, and channel 87. Pad support member 89 can be an elongated member with a shape that can support pad 84 and be received by a receiving member on pad 84 (e.g., grooves 85, 185, and/or channel 87; FIGS. 8-10; recessed portion 285; FIG. 19).

Pad support member 89 can attach to and support pad 84 in any of many different ways. As described further herein, pad 84 can attach to pad support member 89 by way of grooves 85, 185, and/or channel 87 that wrap partially around the longitudinal circumference of pad support member 89 (FIGS. 8-10). Pad support member 89 can span, or wrap around, some, most, or all of the circumference, the length and/or width, and/or any of the superior, inferior, anterior, and/or posterior edges of the pad 84, to engage with a corresponding portion of grooves 85, 185, and/or channel 87, to attach pad support member 89 to pad 84. In some embodiments, pad support member 89 can be shaped to wrap completely around a portion of pad 84, such that pad support member forms an opening (e.g., a loop) which can receive a portion of pad 84 (see, e.g., FIG. 16). In some embodiments, these features and function of pad support 89 allow it to attach to and support pad 84 without using mechanical fasteners, adhesives, or other attachment methods that might be prone to getting caught on external objects. In some embodiments, pad support member 89 can wrap around from approximately 5% to approximately 95%, or approximately 20% to approximately 90%, or approximately 45% to approximately 80%, or approximately 60% to approximately 70%, of the circumference or periphery of pad 84.

Figure 12:
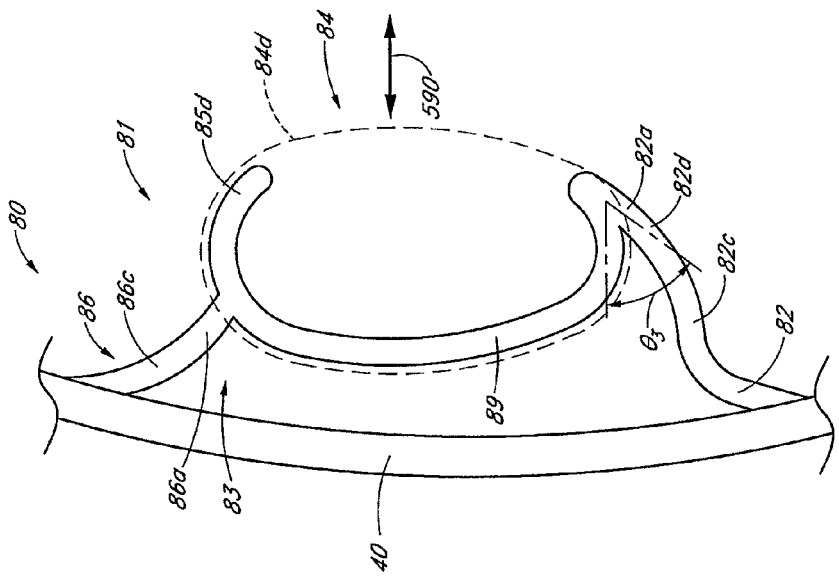
FIG. 12 shows a side schematic view of a nosepiece support.

In some embodiments, pad support member 89 can attach to a portion of frame 10, such as to orbitals 40, without an intermediate structure (e.g., FIG. 15). In some embodiments, pad 84 by itself can be shaped and sized in a manner that is the same as or similar to the shape of the combined pad 84 and pad support 81, and thus all disclosures herein related to the pad support 81 can be applied to a region on the pad 84 itself. In some embodiments, such as those wherein the pad 84 is shaped like a combine pad 84 and pad support 81 as illustrated herein, there may be no need for a separate pad support 81. The pad 84 can be connected directly to the frame, lens, or optical zone. In some embodiments, pad support member 89 can attach to a portion of frame 10 with an intermediate structure, such as struts 82 and/or 86. Struts 82, 86 can attach to pad support section 89 at any position along the length of pad support section 89. In some embodiments, the distal region 82a of strut 82 can attach to pad support member 89 proximate to the inferior end of pad support member 89 (see, e.g., FIGS. 7, 11, and 12). In some embodiments, the distal region 86a of strut 86 can attach to pad support member 89 proximate to the superior end of pad support member 89 (see, e.g., FIGS. 7 and 11). Struts 82 and/or 86 can attach to pad support member 89 between the inferior and superior ends of pad support section 89, as described further below (FIG. 12). In the exemplary embodiment of FIGS. 6 and 7, the distal ends of struts 82, 86 are attached to the inferior and superior ends, respectively, of pad support member 89, to form a continuous curve or spline, without a break or protrusion, from the proximal end 82b of strut 82 to a proximal end 86b of strut 86.

Figure 14:
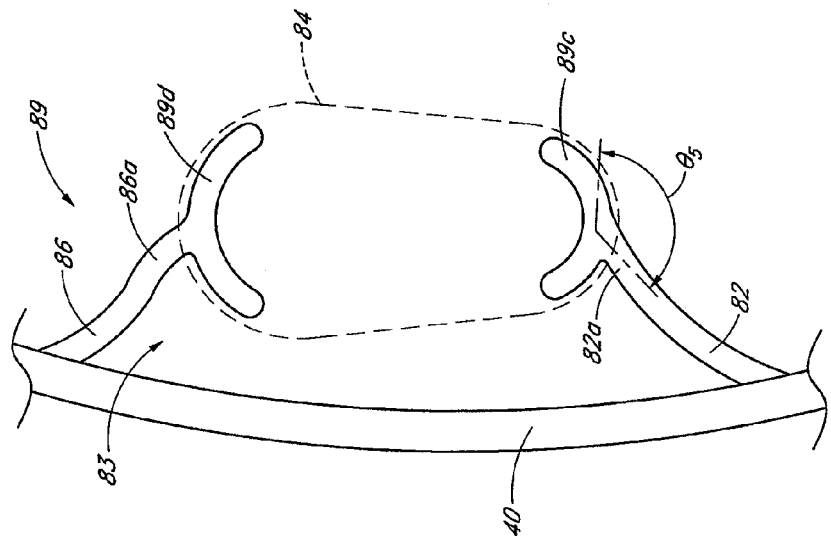
FIG. 14 shows a side schematic view of a nosepiece support.

Pad support member 89 can extend from struts 82, 86 in many different directions relative to struts 82, 86. In some embodiments, pad support member 89 can extend laterally from struts 82 and/or 86 (e.g., distal ends 82a, 86a), as shown in FIGS. 7, 11, 12, 13, 14 and 15. In some embodiments, pad support member 89 can extend medially from struts 82 and/or 86 (e.g., distal ends 82a, 86a), as shown in FIGS. 12 and 14. In some embodiments, portions of pad support section 89 can extend from struts 82, 86 in both medial and lateral directions, as shown in FIGS. 12 and 14.

Pad support member 89 can be attached to and positioned relative to strut 82 at various angles, including any of the angles or ranges of angles θ1 described herein (FIG. 7). For exemplary purposes, and without limitation, FIG. 12 shows pad support section 89 attached to strut 82 at a substantially acute angle θ3; FIG. 13 shows pad support section 89 attached to strut 82 at an approximately 90 degree, or orthogonal angle θ4; and FIG. 14 shows pad support section 89 attached to strut 82 at a substantially obtuse angle θ5. Pad support member 89 can be attached to and positioned relative to strut 86 at similar angles and ranges of angles as the attachment of member 89 to strut 82.

FIG. 11 shows a side schematic view of an exemplary embodiment of nosepiece 80. Nosepiece 80 can comprise a pad support 81 comprising a pad support member 89 connected to orbital 40 with struts 82 and 86, functioning similar to those described herein and shown in FIGS. 6-7. FIG. 11 shows, for exemplary purposes only, an embodiment with struts 82 and 86 attached to orbital 40 at substantially acute angles, θ1 and θ2, respectively. FIG. 11 also shows an illustrative embodiment wherein the struts 82 and 86 comprise an inferior facing concave section 82c, a superior facing concave section 86c, an inferior facing convex section 82d, and a superior facing convex section 86d. FIG. 11 also shows an embodiment wherein pad support member 89 extends laterally from the distal ends of struts 82 and 86.

FIG. 12 shows a side schematic view of another exemplary embodiment of nosepiece 80. Pad 84 is shown in phantom lines for clarity. FIG. 12 shows an exemplary embodiment wherein a portion of pad support member 89 extends laterally from the distal region 86a of strut 86, and the remainder of pad support member 89 extends medially from the distal ends 82a, 86a of struts 82, 86, respectively. Extending pad support member 89 medially from the ends of struts 82, 86 can facilitate the attachment and/or removal of pad 84 from member 89, for example, by moving pad 84 in the directions shown by arrows 590 relative to member 89. This embodiment can prevent interference between pad 84 and the frame 10 to which nosepiece 80 is attached during the attachment and/or removal of pad 84 from member 89. Strut 86 is shown attached to pad support member 89 at a point along pad support member 89 between the inferior and superior ends of pad support member 89, to provide greater support along a lateral superior portion of pad 84. In some embodiments, pad support member can comprise a substantially convex portion 85d positioned at its distal end. Convex portion 85d can be configured to be substantially continuous and aligned with the lateral edge or side 84d (e.g., a convex edge or side) of pad 84. Convex portion 85d can be similar to and function substantially similarly to convex portions 82d, 86d described further herein.

Strut 82 can comprise concave portion 82c that transitions into convex portion 82d at the attachment between the end 82a of strut 82 to the inferior end of pad support member 89. Strut 82 and pad support member 89 can be connected at a substantially acute angle θ3. Convex portion 82d can be configured to be aligned with, e.g., to provide a smooth transition with, the lateral edge or side 84d (e.g., a convex edge or side) of pad 84, such that strut 82 and pad 84 form a substantially continuous, generally convex portion, without substantial breaks, abrupt changes in direction, or sharp or harsh edges.

FIG. 13 shows a side schematic view of another exemplary embodiment of nosepiece 80. Pad 84 is shown in phantom lines for clarity. In this embodiment, pad support member 89 can comprise an inferior pad support section 89a and a superior pad support section 89b spaced apart from each other to allow pad 84 to be positioned and held therebetween. Sections 89a, 89b are shown attached to and laterally extending from the distal ends 82a, 86a of struts 82, 86, respectively, although sections 89a, 89b can extend laterally and/or medially therefrom. In some embodiments, the distal ends of sections 89a and 89b can be separate from each other. Pad support sections 89a and/or 89b can be attached to and support (e.g., span and/or wrap around) pad 84 in a manner similar to pad support member 89 described further herein. Sections 89a and/or 89b can extend at various angles relative to struts 82, 86 (e.g., angle θ6) as described herein for the positioning and function of pad support member 89 relative to struts 82, 86. Pad support sections 89a, 89b can attach to and/or be removed from pad 84 in many ways, including in the manner described herein for other embodiments by using grooves 85, 185, described herein. In some embodiments, support sections 89a, 89b can be attached to and removed from pad 84 by inserting and removing support sections 89a and/or 89b into optional openings 188 in channel 87 of pad 84 in the directions shown by arrows 590. Channel 87 is shown extending through the width of pad 84 for exemplary purposes only, and that in some embodiments, channel 87 can extend from the medial edge of pad 84 partially into pad 84, without an opening 188 on the lateral edge of pad 84. Channel 87 can comprise gap 187 (FIG. 10) to receive sections 89a and/or 89b into channel 87, although channel 87 in FIG. 13 is shown without gap 187, for illustrative purposes only.

FIG. 14 shows a side schematic view of another exemplary embodiment of nosepiece 80. Pad 84 is shown in phantom lines for clarity. In this embodiment, pad support member 89 can comprise an inferior pad support section 89c and a superior pad support section 89d spaced apart from each other to allow pad 84 to be positioned therebetween. Pad support sections 89c and/or 89d can function substantially similarly to the manner of pad support sections 89a and 89b shown in FIG. 13. Sections 89c and 89d can differ in that the distal ends 82a, 86a of struts 82, 86 can be attached along the length of (e.g., between the opposed ends) of sections 89c and 89d, such that the opposed ends of sections 89c and 89d extend both medially and laterally from distal ends 82a, 86a.

FIG. 15 illustrates a partial side view of an exemplary embodiment of nosepiece 80 attached to and integrated with a portion of frame 10, such as an orbital 400. Nosepiece 80 can comprise pad support member 89 and pad 84. Pad 84 is shown in phantom for clarity. Nosepiece 80, pad support member 89, pad 84, and orbitals 400 can be substantially similar to and function substantially similar to the manner of nosepiece 80, pad support member 89, pad 84, and orbital 40 in the embodiments shown in FIGS. 6, 7, and 11-14. Orbital 400 can comprise an inferior portion 40a and a superior portion 40b spaced apart from each other. A superior end of inferior portion 40a can attach to strut 82 (e.g. the proximal end 82c). An inferior end of superior portion 40b can attach to strut 86 (e.g., the proximal end 86c). Pad support member 89 can be positioned between the superior end of inferior portion 40a and the inferior end of superior portion 40b, without requiring an additional member (e.g., an additional portion of orbital 400) separately extending between the proximal ends 82c, 86c of struts 82, 86, respectively. Orbital 400 and pad support member 89 can comprise an integrated, continuous spline that wraps around and supports pad 84. Thus, orbital 400 and pad support 89 can support pad 84 without an enclosed cell 83, and without any protrusions, cross members, struts, or other structure on which a user's hair, jewelry, etc, could snag or catch.

FIG. 16 illustrates a partial cross-sectional side view of an embodiment of a pad support 181 attached to orbital 40 and supporting a pad 84. Pad support 181 can attach to orbital 40 with struts 82, 86. Pad support 181, pad 84, struts 82, 86, and orbital 40 can be structurally similar to, and function similar to the manner of, pad support 81, pad 84, struts 82, 86, and orbital 40 described in the embodiments shown in FIGS. 6, 7, and 11-14. Pad support 181 can comprise a support member 189 that can comprise a loop, or an opening 190 that can wrap, or encircle most, or as illustrated, all of a portion of pad 84. FIG. 16 shows support member 189 in an approximately ovular, toroidal shape for exemplary purposes only, and support member 189 can comprise any shape (e.g., a plate-like structure and the like), with one or more openings of various shapes that can wrap or encircle most or all of a portion of pad 84.

Figure 17:
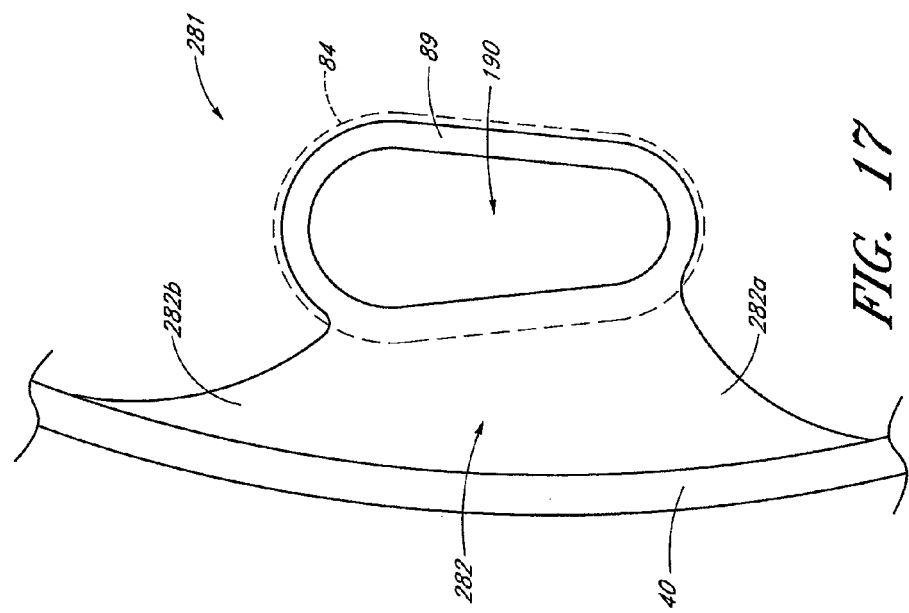
FIG. 17 illustrates a partial side view of a pad support attached to and supporting a pad.

FIG. 17 illustrates a partial side view of an embodiment of a pad support 281 attached to orbital 40 and supporting a pad 84. Pad support 281 can comprise a medial support structure 282 with a first side attached to pad support member 89 and/or pad 84, and a second, opposed side attached to orbital 40. Pad support 281 can comprise an inferior portion 282a and a superior portion 282b that can be attached to orbital 40, pad 84, and a pad support member 289. Pad support 281, inferior portion 282a, superior portion 282b, and medial support structure 282 can be substantially similar to and function substantially similar to the manner of the pad supports, pads, orbital and struts described herein and shown in FIGS. 6, 7, and 11-16. Instead of being supported by the pair of struts 82, 86, the pad support member 89 of pad support 281 can be supported by the medial support structure 282.

FIG. 18 is a rear elevation view of an embodiment of frames 10, wherein nosepieces 80 can attach to a portion of lenses 50, as described elsewhere herein.

FIG. 19 is a side view of an embodiment of a nosepiece 180 attached to a pad 84. Pad 84 can comprise a recessed portion 285 that can receive a pad support member 189 to hold and support pad 84, substantially similar to the function of groove 185 shown in FIG. 9. In this embodiment, the shape of recessed portion 285 and support member 189 can be selected to represent various insignia desired by the user, such as a star, peace symbol, initials, logos, and the like. When shaped like an insignia, support member 189 and recessed portion 185 can provide both functional support for pad 84 and aesthetic appeal to the user.

Although certain preferred embodiments and examples have been discussed herein, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the present disclosure, including the appended claims.

The following is claimed:

1. A nosepiece for eyewear, comprising:
   a nosepiece pad comprising a receiving portion;
   a pad support, comprising:
      a first strut with a downwardly concave portion, the first strut configured for attachment to a first portion of an eyewear;
      a second strut with an upwardly concave portion, the second strut configured for attachment to a second portion of an eyewear; and
      a pad support member attached to the first and second struts, the pad support member comprising an upwardly concave portion attached to the first strut, the pad support member being configured to contact the receiving portion of the nosepiece pad and wrap around at least a portion of the nosepiece pad.

2. The nosepiece of claim 1, wherein the receiving portion comprises a groove extending into a surface of the pad.

3. The nosepiece of claim 1, wherein the nosepiece forms a portion of a frame of an eyewear.

4. The nosepiece of claim 1, wherein the pad support is made of a rigid material.

5. The nosepiece of claim 4, wherein the pad support is made of a resilient material.

6. The nosepiece of claim 1, wherein a distal end of the first strut is attached to an inferior end of the pad support member.

7. The nosepiece of claim 1, wherein the receiving portion extends in depth radially inwardly from a surface of the pad.

8. The nosepiece of claim 1, wherein the pad support is made of a resilient material.

9. The nosepiece of claim 1, wherein the first strut extends continuously upwardly from the point of contact with the eyewear face to the point of first contact with the pad.

10. The nosepiece of claim 9, wherein the second strut extends continuously downwardly from the point of contact with the eyewear face to the point of first contact with the pad.

11. An eyewear configured to avoid entanglement or interference with other objects while moving the eyewear into or out of the viewing position, the eyewear comprising:
an eyewear face comprising optical viewing zones;
a resilient pad with upper and lower ends;
a curvilinear lower strut extending from the eyewear face to the pad, wherein the vertical distance between the highest point on the lower strut and the lowest point of the pad is approximately equal to or less than the horizontal distance between a rear surface of the eyewear face and the pad; and
a curvilinear upper strut extending from the eyewear face to the pad, wherein the vertical distance between the lowest point on the upper strut and the highest point on the pad is approximately equal to or less than the horizontal distance between a rear surface of the eyewear face and the pad.

12. The eyewear of claim 11, wherein the lower strut extends continuously upwardly from the eyewear face to the first point of contact between the lower strut and the pad.

13. The eyewear of claim 12, wherein the upper strut extends continuously downwardly from the eyewear face to the first point of contact between the upper strut and the pad.

14. The eyewear of claim 11, wherein the lower and upper struts each comprise a concavity.

15. The eyewear of claim 14, wherein the concavity of the lower strut is oriented generally downwardly and the concavity of the upper strut is oriented generally upwardly.

16. The eyewear of claim 15, wherein the lower and upper struts are generally smooth.

17. The eyewear of claim 15, wherein the lower strut comprises a second concavity along a region of contact between the lower strut and the pad, and wherein the upper strut comprises a second concavity along a region of contact between the upper strut and the pad.

18. The eyewear of claim 17, wherein the at least two concavities on each strut are oriented in generally opposite directions.

19. The eyewear of claim 11, wherein the struts are attached to a pad support that wraps around at least a portion of the pad.

20. The eyewear of claim 11, wherein the distance between the upper and lower ends of the pad is greater than or equal to the distance between the closest points on the lower and upper struts.

* * * * *